(12) United States Patent
Knöpfle

(10) Patent No.: US 12,343,959 B2
(45) Date of Patent: Jul. 1, 2025

(54) VEHICLE WINDOW WITH A LIGHTING DEVICE

(71) Applicant: Webasto SE, Stockdorf (DE)

(72) Inventor: Julian Knöpfle, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/597,668

(22) Filed: Mar. 6, 2024

(65) Prior Publication Data

US 2024/0300218 A1    Sep. 12, 2024

(30) Foreign Application Priority Data

Mar. 8, 2023   (DE) ..................... 10 2023 105 780.4

(51) Int. Cl.
  *B32B 17/10* (2006.01)
(52) U.S. Cl.
  CPC .... *B32B 17/1011* (2013.01); *B32B 17/10036* (2013.01); *B32B 17/10541* (2013.01)
(58) Field of Classification Search
  CPC ........... B32B 17/1011; B32B 17/10036; B32B 17/10541
  USPC ...................................................... 428/192
  See application file for complete search history.

(56) References Cited

U.S. PATENT DOCUMENTS

| 2012/0087127 A1* | 4/2012 | Veerasamy ....... B32B 17/10788 |
| | | 362/249.02 |
| 2013/0033894 A1* | 2/2013 | Kleo .................... G02B 6/0095 |
| | | 362/602 |
| 2023/0118480 A1 | 4/2023 | Pasquarelli |

FOREIGN PATENT DOCUMENTS

| DE | 102017005281 A1 | 12/2018 |
| DE | 102020109338 B3 | 5/2021 |
| DE | 102021122986 A1 | 3/2023 |
| DE | 102022108689 A1 | 10/2023 |

OTHER PUBLICATIONS

Office Action issued against corresponding German Application No. 10 2023 105 780.4; mailed Jan. 10, 2024 In German with English Machine Translation (12 pages).

* cited by examiner

*Primary Examiner* — Betelhem Shewareged
(74) *Attorney, Agent, or Firm* — Fitch, Even, Tabin & Flannery, LLP

(57) ABSTRACT

A vehicle window pane includes a light guide layer and a lighting device which introduces light from a lamp into the light guide layer via a light-incoupling unit arranged on the light guide layer. The lamp is mounted on a support plate and a fastening device keeps the support plate positioned in such a position on the light-incoupling unit in which the lamp is correctly positioned to radiate light into the light-incoupling unit. A covering which covers the support plate is provided. The covering is kept in its covering position on the vehicle window pane by means of a holding device, and the covering comprises a pressing unit, which preloads the support plate against the light-incoupling unit, on its inner side that faces the support plate.

12 Claims, 13 Drawing Sheets

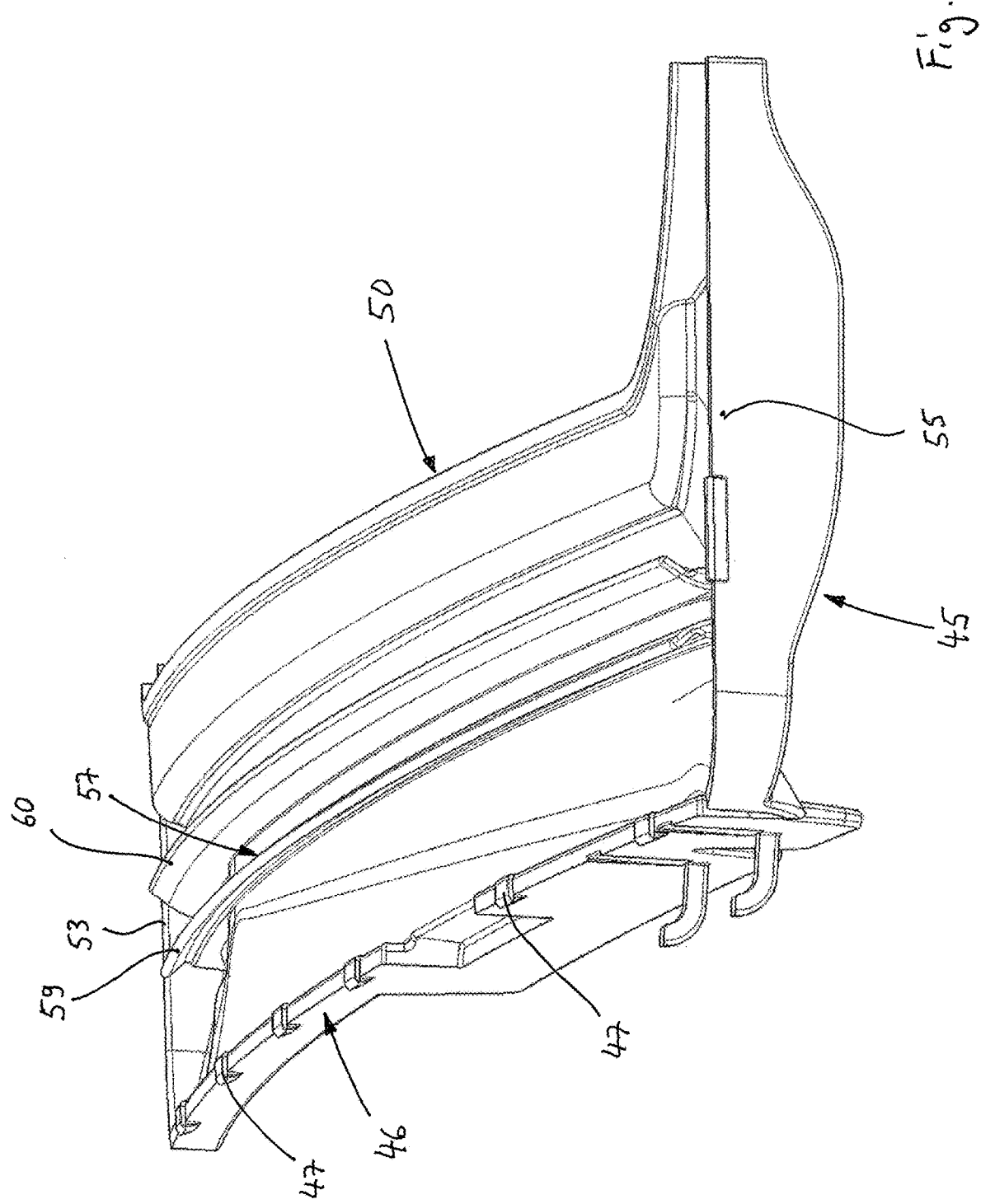

VEHICLE WINDOW WITH A LIGHTING DEVICE

CROSS-REFERENCE TO RELATED APPLICATION

This application claims the benefit of German patent application no. 10 2023 105 780.4, filed Mar. 8, 2023, which is incorporated herein by reference in its entirety.

TECHNICAL FIELD

The invention relates to a vehicle window pane with a light guide layer and with a lighting device which introduces light from a lamp into the light guide layer via a light-incoupling unit arranged on the light guide layer.

BACKGROUND

DE 10 2020 109 338 B3 discloses a generic vehicle window pane. A lighting device of the vehicle window pane comprises a lamp, which is arranged on an end side of an elongate rod-shaped light guide made, for example, of PMMA or PC. The lighting device further comprises a strip-type light-incoupling element with a cross-sectionally wedge-shaped body. The light-incoupling element, which is made of a plastics material such as PMMA, and the light guide extend over the length of the lighting device, wherein the light guide is arranged directly in front of a lateral elongate end face of the light-incoupling element. A covering covers the lighting device downwardly towards a vehicle interior.

SUMMARY

The invention is based on the object of providing a vehicle window pane mentioned in the introduction which is improved in terms of the attachment of the lamp of the lighting device.

This object is achieved according to the invention for the vehicle window pane mentioned in the introduction in that the lamp or illuminant is mounted on a support plate and a fastening device keeps the support plate positioned in such a position on the light-incoupling unit in which the lamp is correctly positioned to radiate light into the light-incoupling unit. Furthermore, a covering which covers the support plate is provided. In this case, the covering is kept in its covering position on the vehicle window pane by means of a holding device. The covering comprises a pressing unit, which preloads the support plate against the light-incoupling unit, on its inner side that faces the support plate.

Advantageous embodiments of the invention are specified in the dependent claims.

In the case of the vehicle window pane according to the invention, the covering which covers the support plate is thus fixedly and preferably releasably connected to the vehicle window pane. By fixedly attaching the covering to the inner side of the vehicle window pane, the covering can apply the contact pressure needed to press the support plate against the light-incoupling unit by means of the pressing unit. The holding device holds the covering in its covering position such that it can be re-detached and removed from its covering position when the support plate is to be exchanged, for example owing to a defect of the lamp. The covering is a trim part and in particular a screen for shielding light scattered from the lamp in the direction of the vehicle interior. When the covering is being attached in its covering position, the pressing device is elastically deformed. In the process, the pressing device generates a restoring force which preloads the support plate into its position on the light-incoupling unit.

Expediently, the covering or the pressing unit contains at least one elongate element, which is resiliently deformable and applies the necessary restoring force when it deforms. Such an elongate element is in particular a lip. Two such elements or lips which press against the support plate under elastic deformation are preferably provided. Such an elongate element may also be a leg of a component, such as a U-shaped profile.

A preferred embodiment provides that the light-incoupling unit is in the form of an elongate structural unit. The support plate, in the form of an elongate strip, is adapted to the light-incoupling unit. The support plate is furthermore mounted on fastening domes of the light-incoupling unit, which are arranged in series. The fastening domes are arranged on or engage in cutouts in the support plate that are arranged in series, if the cutouts are in the form of through-openings. The for example two elements or lips lie against the support plate on opposite sides of the series of fastening domes or cutouts. The lips are preferably formed and designed such that their preload force owing to their elastic deformation subjects the support plate to uniform loading on either side of the fastening domes. This avoids the possibility of a tilting moment being transferred to the support plate. The legs preferably stand vertically upright on the support plate and are compressed in the vertical direction under elastic deformation. The lips lie on the support plate by way of a side face at least in the region of their front edge and become bent upon being pressed. Such a lip has such elastic flexibility in its longitudinal direction that it can flexibly adapt, for example, to a height offset between two ends of mutually adjoining support plates when they are pressed against the support plates in the region of this height offset.

Preferably, the lips are made from a plastic, in particular from a thermoplastic elastomer (TPE) or a thermoplastic vulcanizate (TPV), preferably in a 2-component injection moulding process, and moulded or foamed onto the covering. TPE and TPV have both the good processing properties of thermoplastic materials and the softness and flexibility of elastomers and are accordingly particularly suitable.

Expediently, the covering is moulded or foamed from a plastic, in particular from PC (polycarbonate), ABS (acrylonitrile-butadiene-styrene) or a mixture of PC and ABS.

According to a preferred embodiment, it is provided that the lighting device with the light-incoupling unit is arranged with an extent along a side edge of the vehicle window pane that is at the side of a window pane longitudinal centre line. The front end of the covering adjoins a front transverse component or a front transverse covering of the vehicle window pane and/or the rear end of said covering adjoins a rear transverse component or a rear transverse covering of the vehicle window pane.

Expediently, the light-incoupling unit is an elongate structural unit which comprises a multiplicity of individual light-incoupling elements, which are arranged next to one another and preferably in series.

Expediently, the holding device contains plug-in parts or tongues, which are arranged on the covering and engage in cutouts or holding openings of a foamed-on edge structure of the vehicle window pane or a part held by the foamed-on edge structure. The plug-in parts or tongues are arranged on a first longitudinal side of the oppositely situated longitudinal sides of the covering device. When the covering, upon being mounted, is plugged by way of its plug-in parts or tongues into the cutouts or holding openings in a holder which is perpendicular or inclined in relation to the vehicle window pane, it can then be pivoted against the vehicle window pane and fixed to the vehicle window pane on its second longitudinal side, for example by means of an adhesive bond. The fixing or adhesive bond is re-detachable for dismounting the covering.

A further preferred embodiment provides that the fastening device comprises at least one fastening dome which protrudes from the light-incoupling unit and projects into a fastening cutout in the support plate. In this case, the deformation-resistant support plate comprises at least one soft region which delimits the fastening cutout and is made to be elastically deformable. A spreading portion of the fastening dome spreads the fastening cutout by elastically deforming the soft region either when the fastening dome is being inserted into the fastening cutout and/or in the functional position of the fastening dome in which it is inserted into the fastening cutout.

The functional position of the fastening dome is a position in which the fastening dome is arranged in the fastening cutout and extends therein such that the fastening device and the light-incoupling unit are fixed relative to one another owing to the elastic deformation and resulting restoring force. The restoring force ensures a clamping action of the fastening cutout of the support plate with respect to the fastening dome.

The support plate is in particular a printed circuit board (PCB) or a board. The support material of the printed circuit board is a hard material or a hard substance, for example a glass-fibre-reinforced plastic or a support material for boards, and gives strength to the support plate.

The support plate has a substantially sheet-like form and has two main faces, which are essentially situated opposite one another and each have essentially the largest surface area with respect to other faces of the support plate. The main faces are delimited around the edge by side faces, wherein the side faces connect the main faces in the thickness direction. The main faces extend predominantly in a longitudinal and transverse direction of the support plate.

The cutouts and the fastening cutouts are preferably in the form of openings passing through the support plate. At least some of the cutouts or fastening cutouts may also be in the form of depressions. Such a depression extends in the direction between the two sheet-like main sides of the support plate, without passing through the support plate. With preference, however, the fastening cutout is in the form of an opening, which extends completely between the main sides and preferably perpendicularly in relation to one of them. A cutout in the form of a depression is, for example, in the form of a groove. The groove may have lateral undercut groove walls, in order to form a holding or latching device for a fastening dome inserted or plugged into the groove.

It is particularly preferred for the fastening cutout to be in the form of a slot. At least one of the two longitudinal sides of the fastening cutout is formed by the soft region. Expediently, both longitudinal sides of the fastening cutout are formed by a soft region. The two soft regions are thus situated opposite one another at the fastening cutout or the slot. Such a slot makes it possible to receive and position the fastening dome adjustably in the longitudinal direction of the slot, in particular for tolerance compensation between the cutouts of the support plate and the fastening domes. In the transverse direction of the slot, the fastening dome is held centrally between the two soft regions or between the soft region and the hard region. Such a slot may also be in the form of a groove in accordance with the above statements.

The fastening dome is preferably a part which is rotationally symmetrical with respect to its longitudinal axis. However, in principle the fastening dome may also have an oval, rectangular, square or polygonal cross-sectional shape.

According to a particularly preferred embodiment, it is provided that a bar forms the soft region. The bar is shaped between an auxiliary cutout formed in the support plate and the fastening cutout. Expediently, the bar is made from the material of the support plate. The auxiliary cutout, which in particular is in the form of a slot, is preferably parallel and adjacent to the fastening cutout. The bar is given such a width or such a cross section that it has the elastic deformability required for the spreading, even if it consists of the hard material of the support plate.

According to one embodiment, it is provided that the light-incoupling elements are fastened as independent, separate, preferably one-piece components to the light guide layer. The light-incoupling elements produced as independent components are fastened to the light guide layer in particular by means of adhesive bonding, by means of potting material, by means of adhesive tape or by means of a holding or clamping device. The light-incoupling elements are in particular wedge-shaped or in the form of prismatic bodies. The light-incoupling elements may be made of and/or comprise glass or a plastics material such as PMMA, PC, PU or COP (cyclic olefin polymer) or COC (cyclic olefin copolymer). A pressure-sensitive adhesive, an optically clear liquid adhesive, EVA, PVB, TPU, an epoxy adhesive or an acrylate adhesive can be used as the material for an adhesive bond. The size of the adhesive face of an adhesive bond is thus limited to the size of a base face of the light-incoupling elements. In particular if the light guide layer is a glass inner pane of the vehicle window pane and the light-incoupling elements are made of a plastics material, the effects of different coefficients of thermal expansion of the materials on the individual adhesive bonds are reduced to such an extent that detachment of the adhesive bonds of the individual light-incoupling elements can be avoided. The base face of the light-incoupling element is in particular also a light-outcoupling face, via which light radiated by the lamp or LEDs is introduced or incoupled into the light guide layer. An immersion medium, for example an immersion oil, may be arranged instead of or in addition to an adhesive face.

In one embodiment, the light-incoupling elements are arranged on the light guide layer, for example by means of foaming, adhesively bonding and/or moulding them on. Even where the following text mentions foaming on, this should be read as moulding and/or adhesively bonding on, unless it is ruled out in technical terms or unless described otherwise. However, for better readability, the two further processes are not explicitly mentioned below. According to one embodiment, the light-incoupling elements are foamed or moulded on the light guide layer by means of a transparent foam material or injection material, such as PU, UV-stabilized TPU, aliphatic TPU for high transparency, or polyisocyanate.

According to a further embodiment, it is provided that the light-incoupling elements are formed in one piece with the light guide layer. A light guide layer made, for example, of clear glass thus contains the light-incoupling elements, which are integrally moulded from the same glass material during production. Due to this one-piece or integrated formation of the light-incoupling elements with the light guide layer, it is not necessary to couple or fasten each individual light-incoupling element to the light guide layer, which would otherwise be the case. This also applies to light-incoupling elements foamed onto the light guide layer.

A light guide layer which is made of a plastics material, in particular as specified above regarding the light-incoupling elements, contains the integrally moulded, foamed-on or moulded-on light-incoupling elements made of the same plastics material or a plastics material with a light refraction index that is the same as or similar to that of the light guide layer.

The use of a multiplicity of individual light-incoupling elements, which are each formed with a small length in the longitudinal direction of their series arrangement, thus makes it possible to better match a curvature of the vehicle window pane due to the individual formation on, the individual integral moulding on or the individual fastening to the light guide layer.

The vehicle window pane may be a one-pane structure or a multi-pane arrangement, for example a composite window pane arrangement. The multi-pane arrangement comprises, for example, two or three sub-panes, which are arranged one on top of another over their surface area. Each of the panes may be made of glass or plastic and may comprise at least one coating and/or film structure. A coating may be an infrared-reflecting layer and/or a low-E layer for reflecting heat rays out of the vehicle interior. Accordingly, the vehicle window pane may be formed in such a way that it has an outer pane and an inner pane, for example a clear glass pane, connected to the outer pane by means of a connecting layer, such as a hot-melt adhesive film. Expediently, the inner pane forms the light guide layer. However, the light guide layer may also be formed by another layer, such as a film or the like. The light guide layer may also be formed by the outer pane. For example, the outer pane projects beyond the inner pane at the lateral longitudinal edge of the vehicle window pane. In this case, according to one embodiment, the light-incoupling unit is arranged at the free strip on the inner side or underside of the overlap of the outer pane with the inner pane.

The vehicle window pane according to the invention may be any window pane of a vehicle glazing, for example the window pane in a cover arranged fixedly or movably in a roof opening, a glazing for a roof module or panoramic roof, or a side window pane, a rear window pane, or a front window pane.

BRIEF DESCRIPTION OF DRAWINGS

The invention is explained in more detail below with reference to the drawing using exemplary embodiments of a vehicle window pane according to the invention. In the figures:

FIG. 13 shows an isometric view of the covering with the two lips.

DETAILED DESCRIPTION

Figure 1:
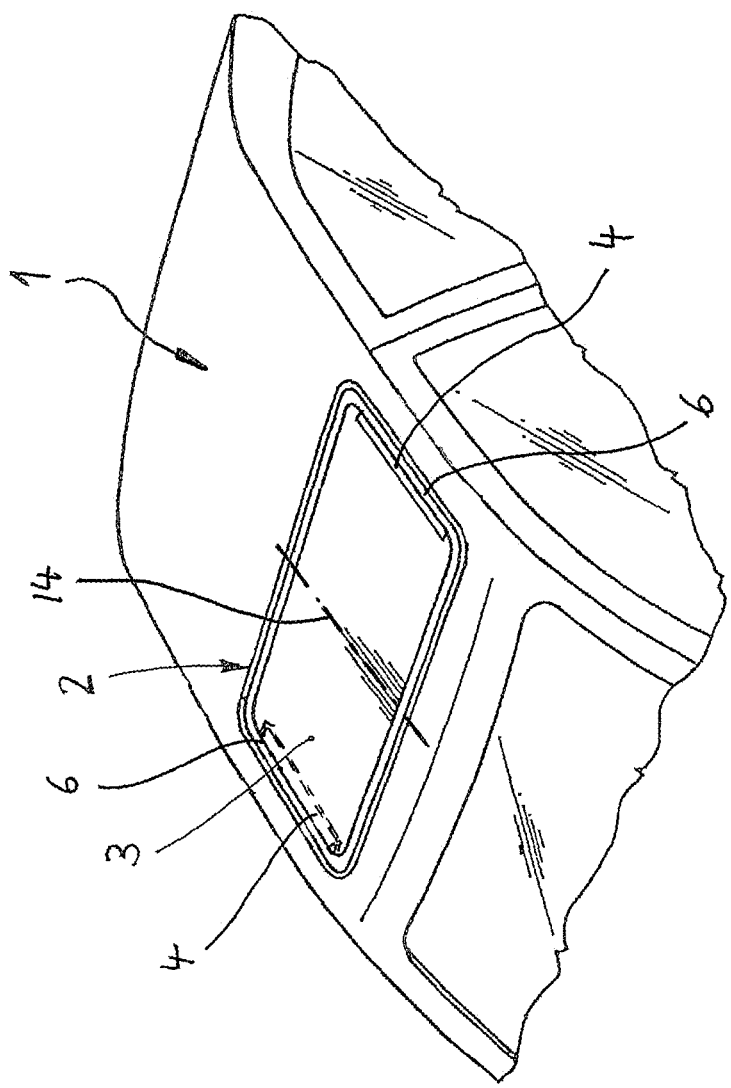
FIG. 1 shows an isometric view of a vehicle roof with a vehicle window pane according to the invention.

A vehicle, such as a passenger car, comprises a vehicle roof 1 (FIG. 1) with a roof opening 2, in which is arranged a vehicle window pane 3 which, for example, is fixedly arranged in the roof opening 2 or is in the form of a cover, which is mounted movably in the roof opening 2 by means of a mounting device and is adjustable between a closed position and ventilating or open positions in a manner known per se. The vehicle window pane 3 may also be a fixed part or portion of a roof module or panoramic roof. The vehicle window pane 3 has a respective lighting device 4, which is arranged on the pane inner side 5, which is the vehicle-interior-facing underside of the cover containing the vehicle window pane 3, and preferably along a respective edge of the vehicle window pane 3 and in particular the lateral side edge 6 of the vehicle window pane 3, with respect to its fitted position in the roof opening 2 of a vehicle roof 1.

Figure 2:
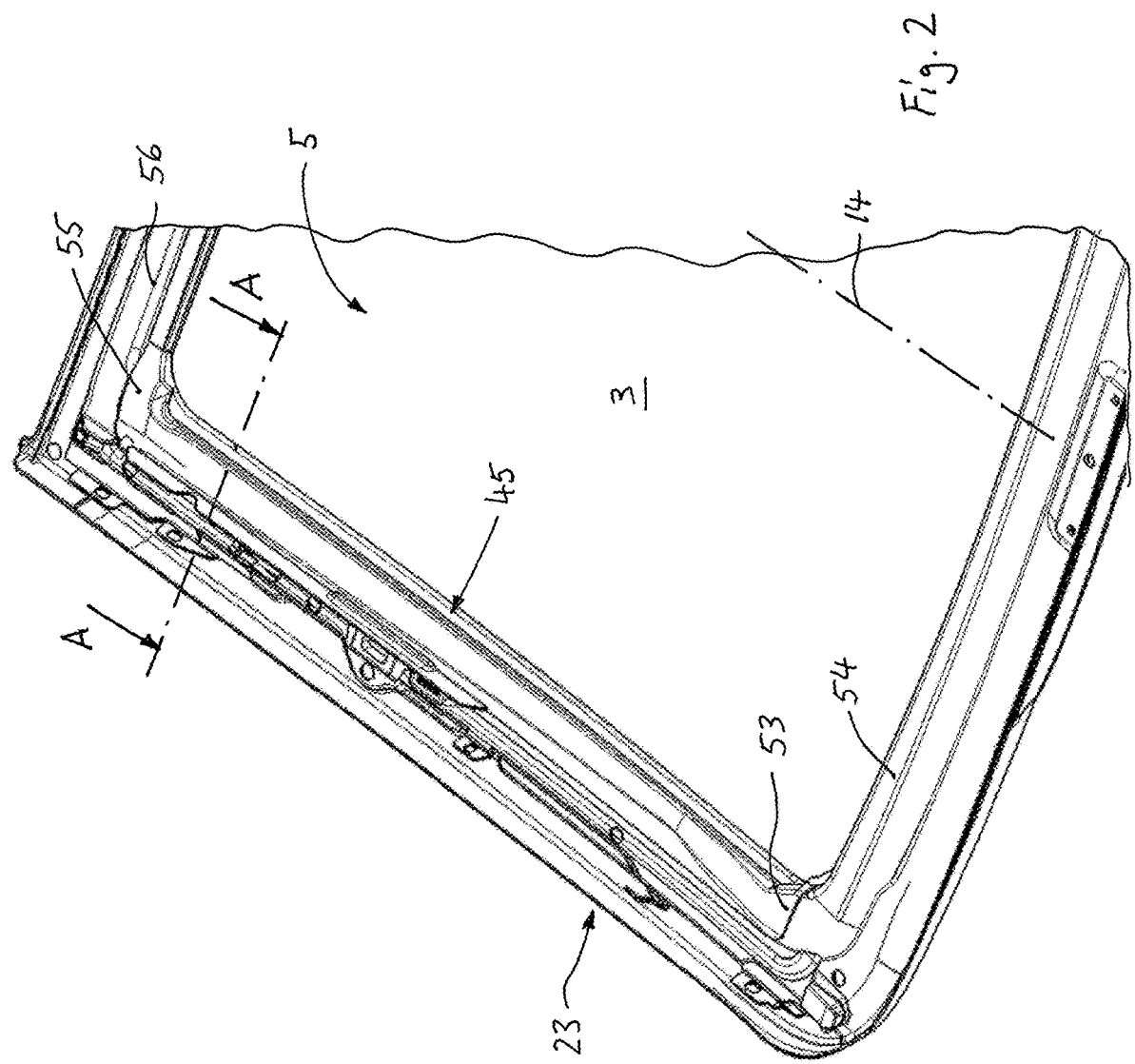
FIG. 2 shows an isometric view of the underside of a cover comprising the vehicle window pane.
Figure 4:
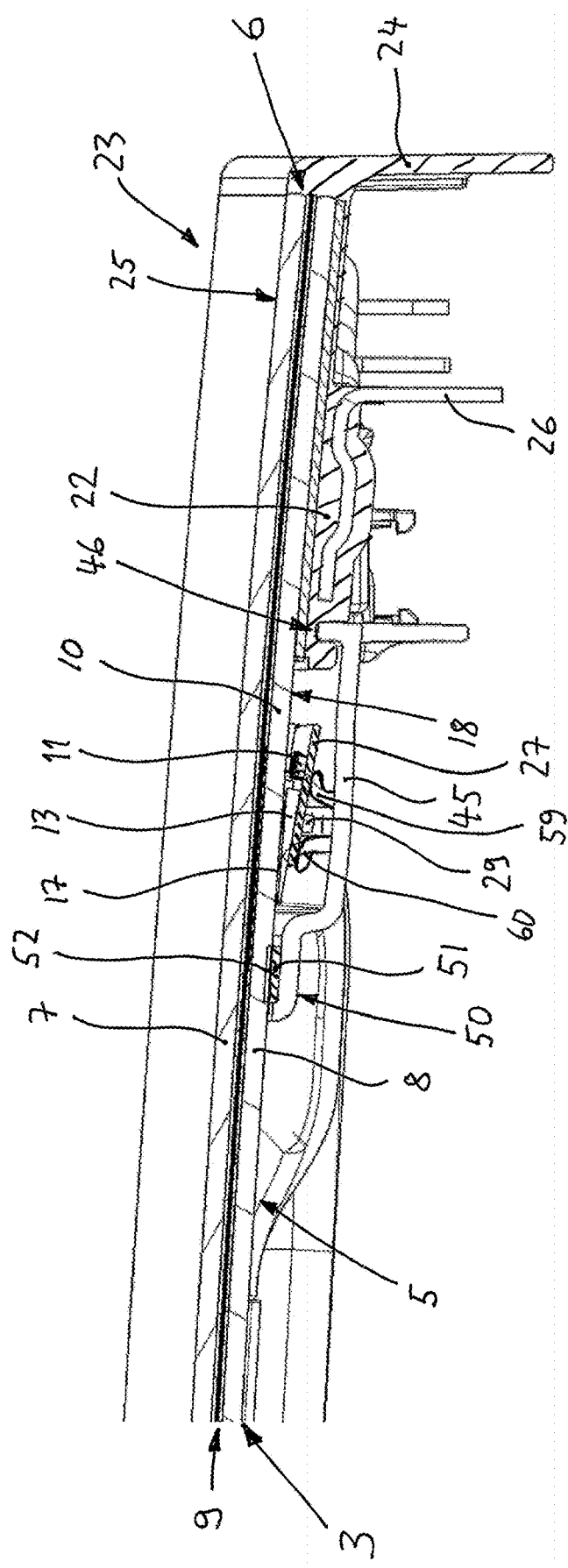
FIG. 4 shows a cross-sectional view, along the sectional plane A-A in FIG. 2, of the lateral edge region of the cover.

The vehicle window pane 3 comprises (see FIGS. 2 and 4) an outer pane 7, an inner pane 8 and a connecting layer 9, which connects the outer pane 7 and the inner pane 8 to one another and contains, for example, a laminate layer, laminate film or hot-melt adhesive film and possibly at least one further interlayer, such as a switchable film. For example, the outer pane 7 is a tinted glass pane. The inner pane 8 is in particular a transparent glass pane or clear glass pane, which forms a light guide layer 10.

Figure 3:
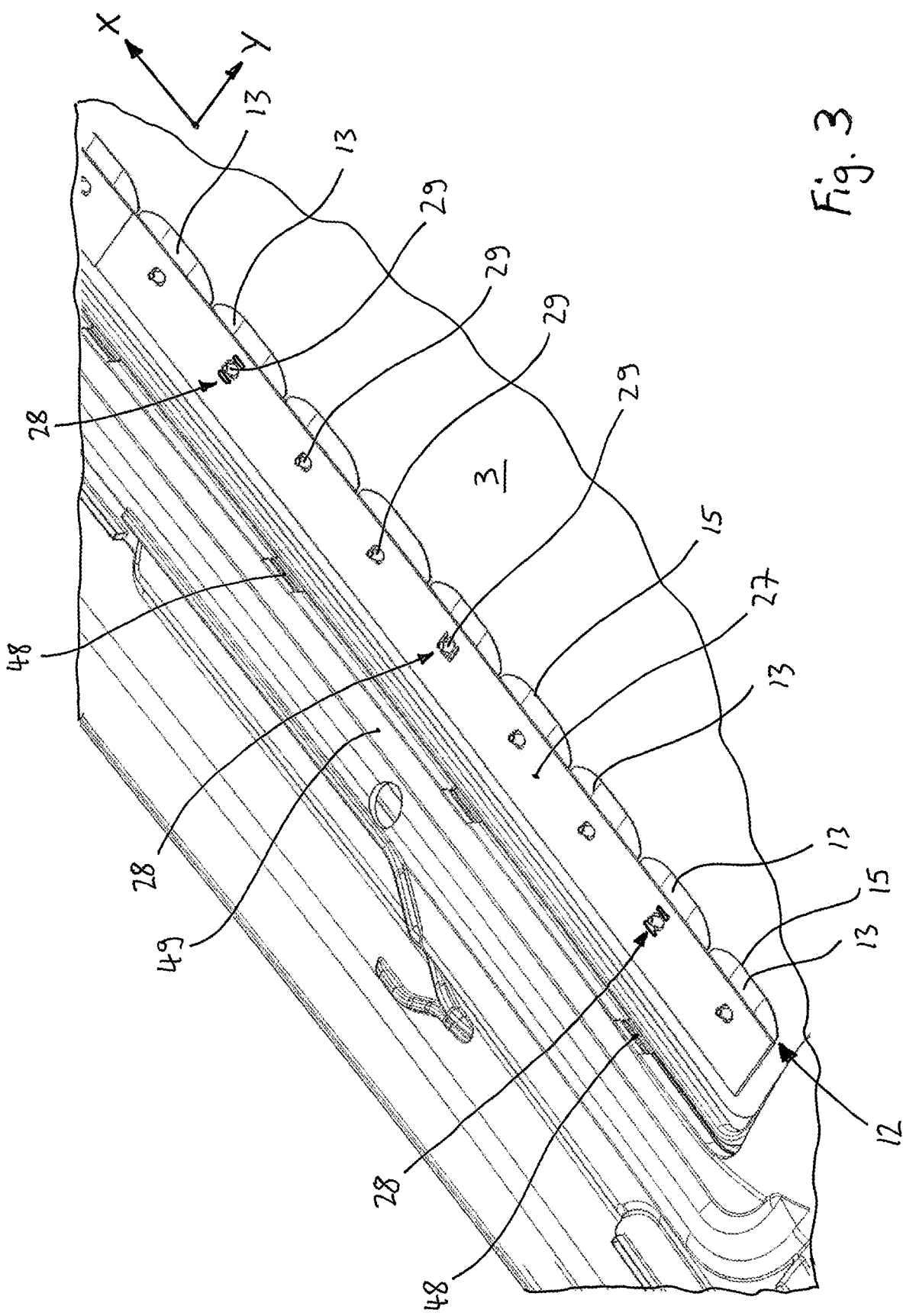
FIG. 3 shows an isometric view of the underside of the cover in FIG. 2 with light-incoupling elements of a lighting device that are arranged on a pane inner side of the vehicle window pane.

The lighting device 4 contains a lamp or illuminant, which comprises, for example, multiple LEDs 11, and a light-incoupling unit 12, which has, for example, multiple light-incoupling elements 13. A respective LED 11 is assigned to a light-incoupling element 13. Multiple light-incoupling elements 13, for example approximately 20 to 30 light-incoupling elements 13, are arranged next to one another in series. The light-incoupling elements 13 have a prismatic and cross-sectionally (FIGS. 3 and 11) substantially wedge-shaped design and a wedge tip 15 directed towards a window pane longitudinal centre line 14 or inwardly with respect to the window pane. Each light-incoupling element 13 constitutes an optical prism and is, for example, an injection moulded part made of transparent plastic. The light-incoupling element 13 has a base face 16, via which it is coupled to the pane inner side 5 by means of a connecting layer 17, for example a transparent adhesive layer, and, according to the embodiment illustrated, is arranged on or adhesively bonded to an inner face 18 of the inner pane 8. The base face 16 faces towards the inner face 18. The light-incoupling element 13 also has a light incidence face 19, which is situated opposite the wedge tip 15, faces towards or is assigned to the side edge 6 of the vehicle window pane 3, and forms an outer side 20 of the light-incoupling element 13 which extends between its base face 16 and a top side 21, situated opposite the base face 16, of the light-incoupling element 13. The light-incoupling elements 13 of each of the two lighting devices 4 are arranged inwardly with respect to the window pane from a foamed-on edge structure 22 of the vehicle window pane 3 which is foamed, for example, from black polyurethane. In this embodiment, in which the vehicle window pane 3 forms a cover 23 for a sliding roof, which is guided outwards for example, the foamed-on edge structure 22 contains a peripheral bezel 24, which surrounds the side edge 6 of the vehicle window pane 3 and adjoins a pane outer side or pane top side 25. The foamed-on edge structure 22, which is attached for example around the periphery of the vehicle window pane 3 or the cover 23, also contains frame parts or reinforcing parts which are incorporated by foaming and have, for example, a fastening leg 26, which projects out of the foamed-on edge structure 22 and is intended to couple a bearing component of a cover bearing mechanism.

The light-incoupling elements 13 may either be fastened as individual components to the light guide layer 10, for example by being adhesively bonded on, or be foamed, moulded or adhesively bonded as foam elements or injection moulded elements onto the light guide layer 10. They may also be formed in one piece with the light guide layer 10, wherein in this case the base face 16 of the light-incoupling element 13 is an imaginary face parallel to the surface of the light guide layer 10 or the pane inner side 5.

An LED 11 of the lamp is assigned to each light incidence face 19 of the light-incoupling elements 13. The LEDs 11 are fixedly attached on a support plate 27, which is in the form of a planar, strip-shaped or band-shaped component used to supply power to the LEDs 11 and their actuator. Such a component is in particular a printed circuit board (PCB) or board. The support material of the printed circuit board is a hard material or a hard substance, for example a glass-fibre-reinforced plastic or a support material for boards, and gives strength to the support plate 27. The support plate 27 is flexurally rigid, such that it adapts to the contour or the profile of the pane inner side 5 without breakage or at least partial destruction of the support material. This is necessary in particular when the vehicle window pane 3 is curved.

The strip-shaped or band-shaped support plate 27 has a form which is adapted to the series of light-incoupling elements 13 of the lighting device 4. The support plate 27 is fastened to the top side 21 of the light-incoupling elements 13 by means of a fastening device 28. The top side 21 is situated opposite the base face 16 of the light-incoupling element 13 and, when the vehicle window pane 3 is attached to the vehicle in its mounted position, faces the vehicle interior. The top side 21 is that side or face which proceeds from the wedge tip 15 at a wedge angle, for example 5° to 15°, with respect to the base face 16 and extends up to the light incidence face 19 on the outer side 20. The magnitude of the wedge angle is selected so as to couple light from the associated LED 11 into the light guide layer 10 at an angle which introduces the light into the light guide layer 10 by total reflection on the inner face of the top side 21 of the prismatic light-incoupling element 13.

Each light-incoupling element 13 has a substantially pin-shaped or peg-shaped fastening element, which is attached or integrally moulded during its production, for example during the injection moulding operation, and is in the form of a fastening dome 29. The fastening dome 29 rises approximately perpendicularly from the top side 21 of the light-incoupling element 13. The fastening domes 29 of the light-incoupling elements 13 arranged in series are on a straight longitudinal line and at the same spacing from one another. Two respective adjacent light-incoupling elements 13 adjoin one another, but may also be at a spacing from one another, connected to one another or else merge into one another. If the vehicle window pane 3 has a curvature in the direction of the series of light-incoupling elements 13, the fastening domes 29 follow a longitudinal line which is curved in a way corresponding to the curvature.

The support plate 27 has multiple cutouts (FIGS. 3 and 6), which are arranged in series over its length, are assigned to the fastening domes 29 of the light-incoupling elements 13, and receive a respective one of the fastening domes 29 when the support plate 27 in its mounted position bears against a bearing surface 30 formed on the top side 21 of each light-incoupling element 13. The bearing faces 30 of the light-incoupling elements 13 lie in a flat surface or, if the vehicle window pane 3 has an aforementioned curvature, in a correspondingly curved surface.

Figure 6:
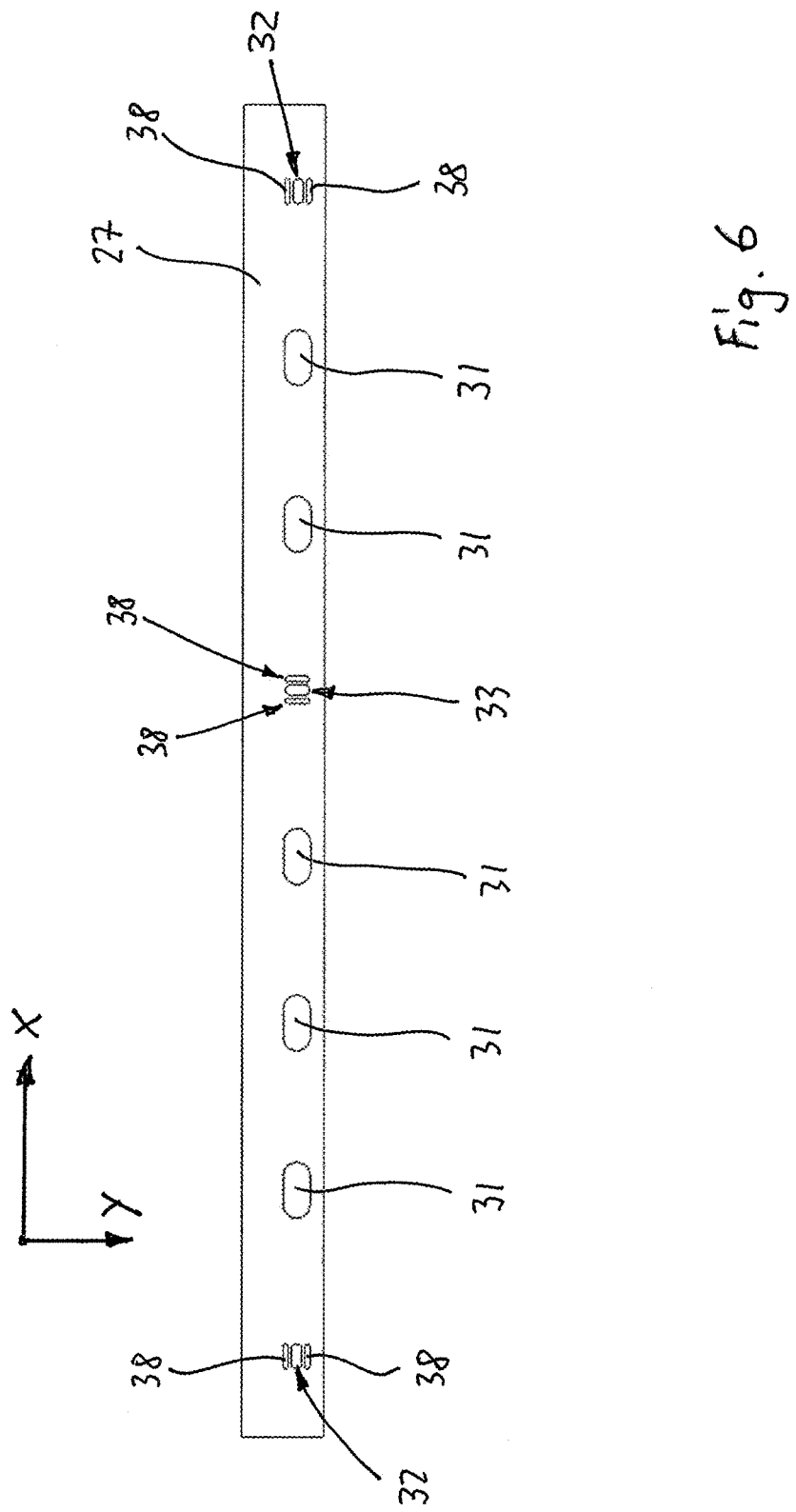
FIG. 6 shows a plan view of a support plate for positioning lamps on the light-incoupling elements.
Figure 7:
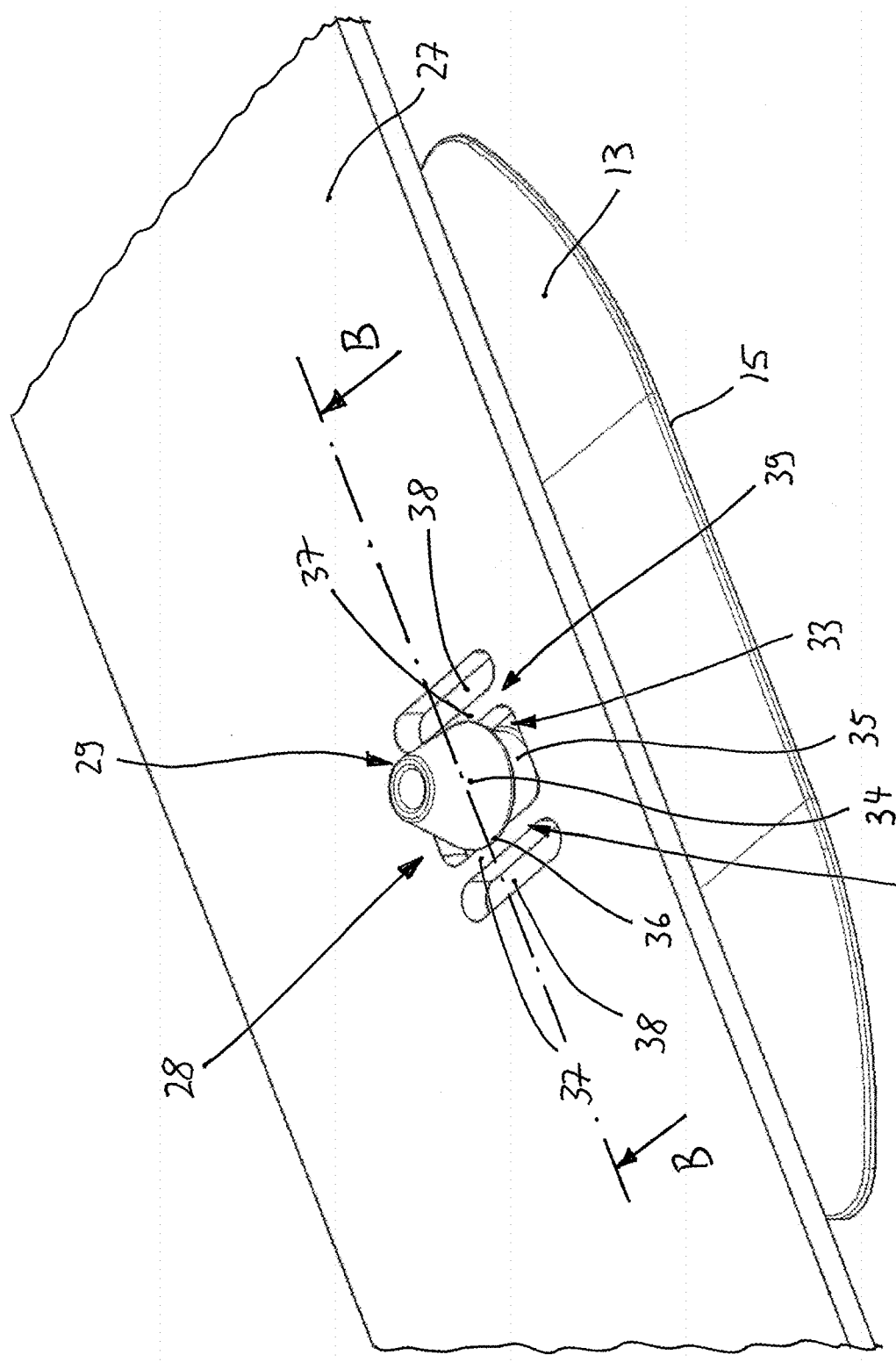
FIG. 7 shows an isometric view of the support plate held on the light-incoupling elements by means of a fastening device.
Figure 8:
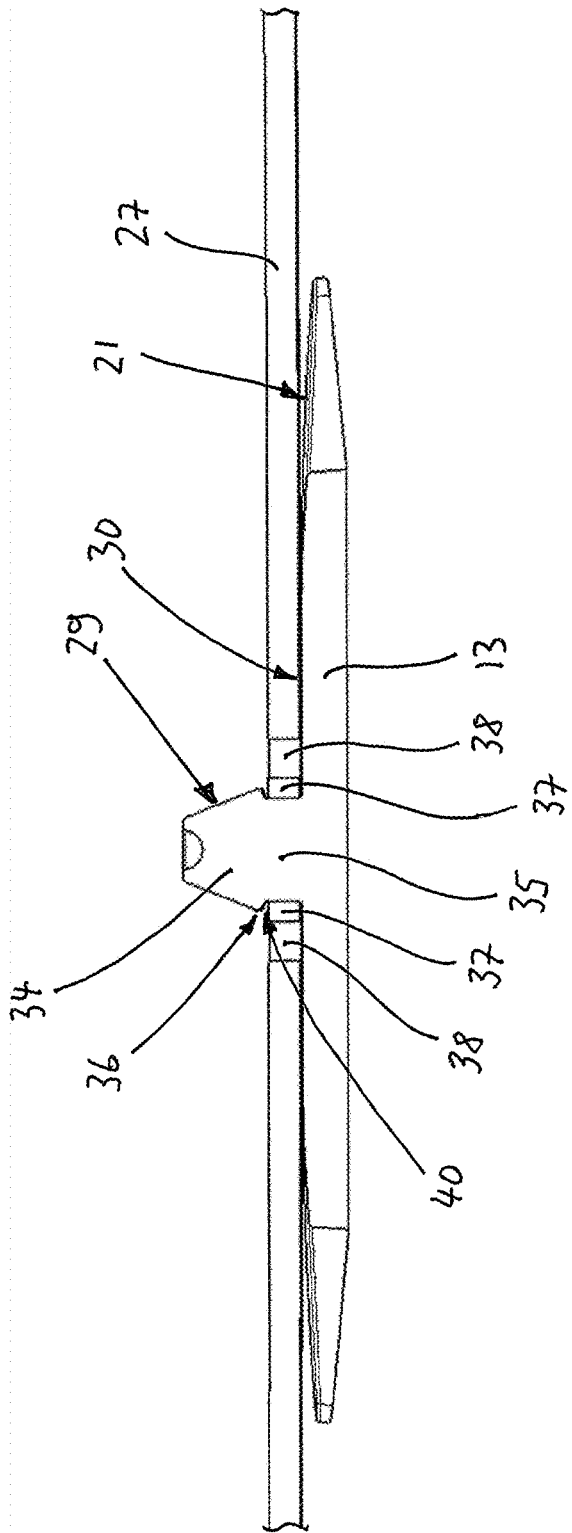
FIG. 8 shows a cross-sectional view, along the sectional plane B-B in FIG. 7, of the support plate held on the light-incoupling elements by means of a fastening dome.

The support plate 27 illustrated by way of example in FIG. 6 has eight cutouts, five of which first cutouts 31 are in the form of slots which extend in the longitudinal direction of the support plate 27 (x direction according to FIGS. 3 and 6) and have such an opening size that the respective fastening dome 29 (see FIG. 3) is received therein with play in the longitudinal and transverse directions. The two cutouts at the ends are first fastening cutouts 32, which receive the respective fastening dome 29 without play in the transverse direction of the support plate 27 (y direction according to FIGS. 3 and 6). A cutout arranged in the central region of the support plate 27 between two first cutouts 31 is a second fastening cutout 33, which receives the associated fastening dome 29 without play in the longitudinal direction of the support plate 27 (x direction according to FIGS. 3 and 6).

In a configuration which is not illustrated, at least two cutouts or first and second fastening cutouts 32, 33 respectively may be offset relative to one another in the transverse direction of the support plate 27.

The second fastening cutout 33 is in the form of a slot with a longitudinal extent in the transverse direction of the support plate 27. The fastening dome 29 has a conical head 34 and a cylindrical base 35 at the transition with the light-incoupling element 13. The diameter of the base 35 corresponds approximately to the width of the slot of the second fastening cutout 33. The conical head 34 of the fastening dome 29, at its annular lower edge 36, has a diameter greater than the diameter of the base 35. The height of the base 35 in the axial direction of the fastening dome 29 substantially matches the thickness of the support plate 27 in the region of the second fastening cutout 33.

The slot of the fastening cutout second 33 is delimited by two mutually opposite bars 37 in the transverse direction in relation to its longitudinal extent and thus at its two mutually opposite longitudinal sides. Each bar 37 is located between a respective auxiliary cutout 38 shaped in the support plate 27 and the slot of the second fastening cutout 33. Each auxiliary cutout 38 is, for example, in the form of an additional slot which extends parallel to and over the length of the slot of the second fastening cutout 33. The width of each auxiliary cutout 38 is less than the width of the slot of the fastening first cutout 31. Each bar 37 has such a small width that—although it is made of the hard support material of the printed circuit board or of the support plate 27—gives it a certain elastic deformability. Owing to this elastic deformability, when the support plate 27 is being attached to the light-incoupling elements 13 and, in the process, the fastening dome 29 is plugged into the second fastening cutout 33, the conical head 34 can press the two bars 37 apart to the necessary extent and in the direction of the respective auxiliary cutout 38. The completely plugged-in fastening dome 29 is secured against being pulled out by its head 34, which forms a latching connection at the two bars 37, which resume their initial positions. The bars 37 are returned to their undeformed initial positions owing to the restoring force generated when they elastically deform. The head 34 of the fastening dome 29 thus constitutes a spreading portion, which spreads the two bars 37 and presses them apart.

At least the head 34 of the fastening dome 29 has such a hardness and low deformability that it does not undergo deformation, or does so only to an irrelevant extent, when it is being plugged into the second fastening cutout 33.

The fastening dome 29 plugged into the second fastening cutout 33 thus holds the support plate 27 in the axial direction of the fastening dome 29 bearing without play against the bearing surface 30 on the top side 21 of the respective light-incoupling element 13. Furthermore, by means of the accurately fitting contact of the base 35 in the slot, the fastening dome 29 holds the support plate 27 without play in its longitudinal direction, whereas the support plate 27 can perform a compensating movement in its transverse direction owing to the movability of the fastening dome 29 in the slot.

The two elastically deformable bars 37 constitute a respective soft region 39 of the support plate 27, which can elastically deform in particular in the plane of the support plate 27 in a manner required for the insertion of the fastening dome 29.

Although the example of FIG. 6 illustrates three fastening cutouts, namely first fastening cutout 32, and second fastening cutout 33, it is also possible for only one, two or more than three to be provided. If there are more than three fastening cutouts, alignment inaccuracies occur in terms of tolerance compensation during the fastening, but a particularly good fixing can be obtained. Three fastening cutouts, namely first fastening cutout 32, and second fastening cutout 33 offer tolerance-optimized positioning or fastening of the support plate 27 on or to the fastening domes 29, so that the support plate can be securely fastened to the associated light-incoupling elements 13 in spite of the position of the latter being modified slightly in the context of tolerances. The use of only one first fastening cutout 32 or second fastening cutout 33 makes it possible to fix the support plate 27 and also have a large tolerance compensation.

According to an alternative embodiment, the second fastening cutout 33 with the slot aligned in the transverse direction contains only one bar 37 and thus only one soft region 39 adjoining the slot. The boundary of the slot that is situated opposite the one bar 37 forms a substantially deformation-free hard region provided by the hard support plate 27. When the fastening dome 29 is being inserted into the second fastening cutout 33, the head 34 deforms this one bar 37 or soft region 39 to a greater extent with respect to the embodiment with two bars 37 or soft regions 39. A greater deformability of the one bar 37 can be achieved, for example, by a reduced width of the bar 37 or by a greater length of the bar 37. A greater length of the bar 37 can be obtained by lengthening the slot and the auxiliary cutout 38.

The two first fastening cutouts 32 at the ends are fundamentally formed in the manner of the central second fastening cutout 33, but have a respective slot which extends in the longitudinal direction of the support plate 27 and has the two bars 37 parallel thereto. By way of these two first fastening cutouts 32, which are thus arranged pivoted at right angles, the associated fastening domes 29 keep the support plate 27 centred in its transverse direction, while the support plate 27 can perform a compensation movement relative to the fastening domes 29 in its longitudinal direction (y direction according to FIG. 6).

A support plate 27 with an arrangement of two outer first fastening cutouts 32, which perform centring in the transverse direction and have an inner second fastening cutout 33 centring in the longitudinal direction and arranged in between them, is sufficient for defined and exact positioning and fixing of the support plate 27 on and to the light-incoupling elements 13 and thus the LEDs 11 relative to the LED faces 19 of the light-incoupling elements 13 if tolerance compensation is required.

The support plate 27 can be produced in a relatively great length ("continuous product") with the slots as a semi-finished product, wherein a specific partial length contains respectively two first fastening cutouts 32 that are arranged at a certain spacing and have slots aligned in the longitudinal direction and one second fastening cutout 33 with a slot aligned in the transverse direction. The support plate 27 may be separated from this semi-finished product in such a region and in such a length that the aforementioned fastening first and second cutouts 32 and 33 respectively are always present.

In this embodiment, the LEDs 11 are LEDs which emit the light laterally and thus emit the light substantially parallel to the support 27 and to the light-incoupling face 19 of the light-incoupling element 13, for example by way of a bundled light beam or else scattered to a certain extent, in their position on the support 27 in which they are on that side of the support 27 that faces the light guide layer 10. Each light-incoupling element 13 guides light radiated in by the LED 11 into the light guide layer 10 via at least one reflection face, and in this light guide layer the light is incident on a light-outcoupling structure, for example a print on the light guide layer 10, by way of further internal reflection and is emitted therefrom to the vehicle interior.

In order to remove a support plate 27 from its mounted position on the light-incoupling elements 13, for example in the case of necessary exchange owing to a defect of the LEDs 11, the head 34, at the transition between its lower edge 36 and the base 35 of the fastening dome 29, contains an annular conical face 40 as auxiliary for pulling the support plate 27 off of the light-incoupling elements 13, while the two bars 37 slide over the conical face 40 out of their latched position and in so doing are spread apart from one another.

The light-incoupling elements 13 are expediently made of a plastics material such as PMMA, PC, PU or COP (cyclic olefin polymer) or COC (cyclic olefin copolymer). The fastening domes 29 may be conjointly integrally moulded from the same plastics material when the light-incoupling elements 13 are being injection moulded. However, the light-incoupling elements 13 may also be integrally moulded from a different plastics material. As a result, the fastening domes 29 may be moulded from a plastics material which is softer than the plastics material of the light-incoupling elements 13, with the result that in particular the head 34 of the fastening dome 29 has a certain elasticity, which owing to its elastic deformation, in particular in the region of its lower edge 36 projecting beyond the base 35, makes it easier to insert the fastening dome 29 into the second fastening cutout 33 and to pull it out in the event of replacement of the support plate 27.

Figure 11:
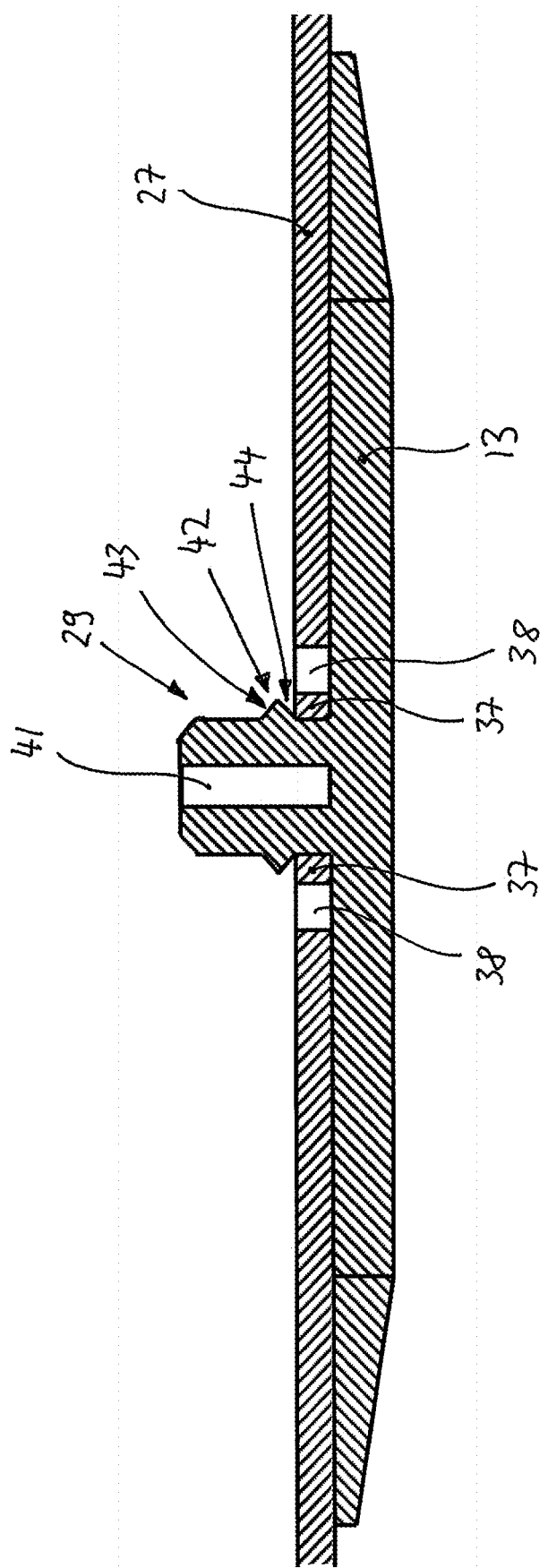
FIG. 11 shows a cross-sectional view corresponding to FIG. 10 of a further embodiment of the fastening device of the support plate.
Figure 12:
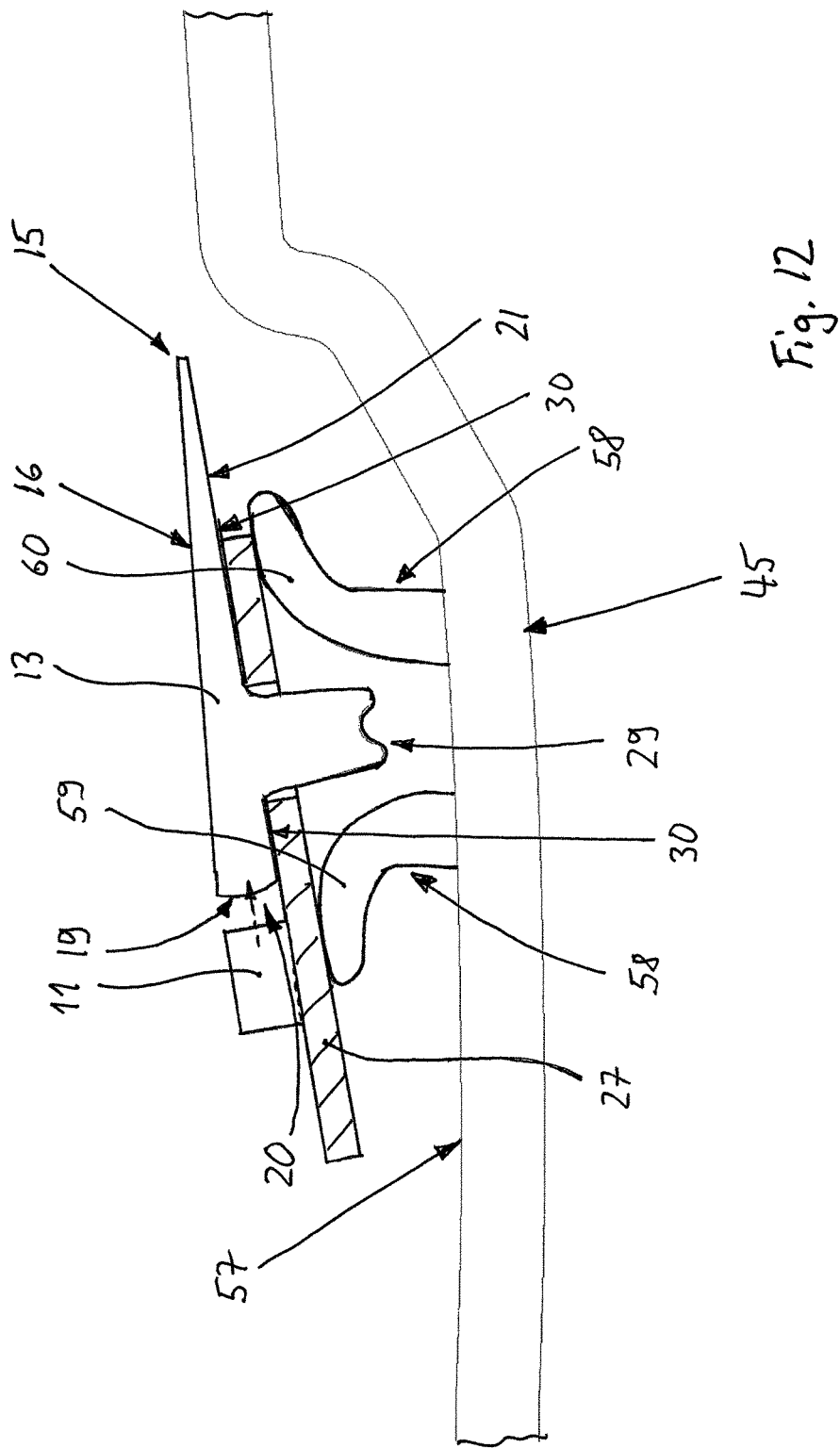
FIG. 12 shows a cross-sectional view of a covering, which uses two elastic lips to preload the support plate in its mounted position against the light-incoupling elements.

The fastening dome 29 illustrated in FIG. 11, in its modified configuration, has a cylindrical shape with a central second cutout 41. The second cutout 41 makes it possible to radially compress the fastening dome 29, with the result that it becomes easier to insert it into the respective second fastening cutout 33 or first fastening cutout 32 owing to its reduced diameter. In addition or alternatively, the fastening dome 29 may contain a radially protruding ring 42, which has an upper conical first flank face 43 rising in the plug-in direction and a lower conical second flank face 44 rising counter to the plug-in direction, which flank faces make it easier to plug the fastening dome 29 into the second fastening cutout 33 or first fastening cutout 32 and to pull it out of the second fastening cutout 33 or first fastening cutout 32. The ring 42 is arranged in such a position on the fastening dome 29 that it holds the fastening dome 29 in the latched position illustrated in FIG. 11.

Figure 9:
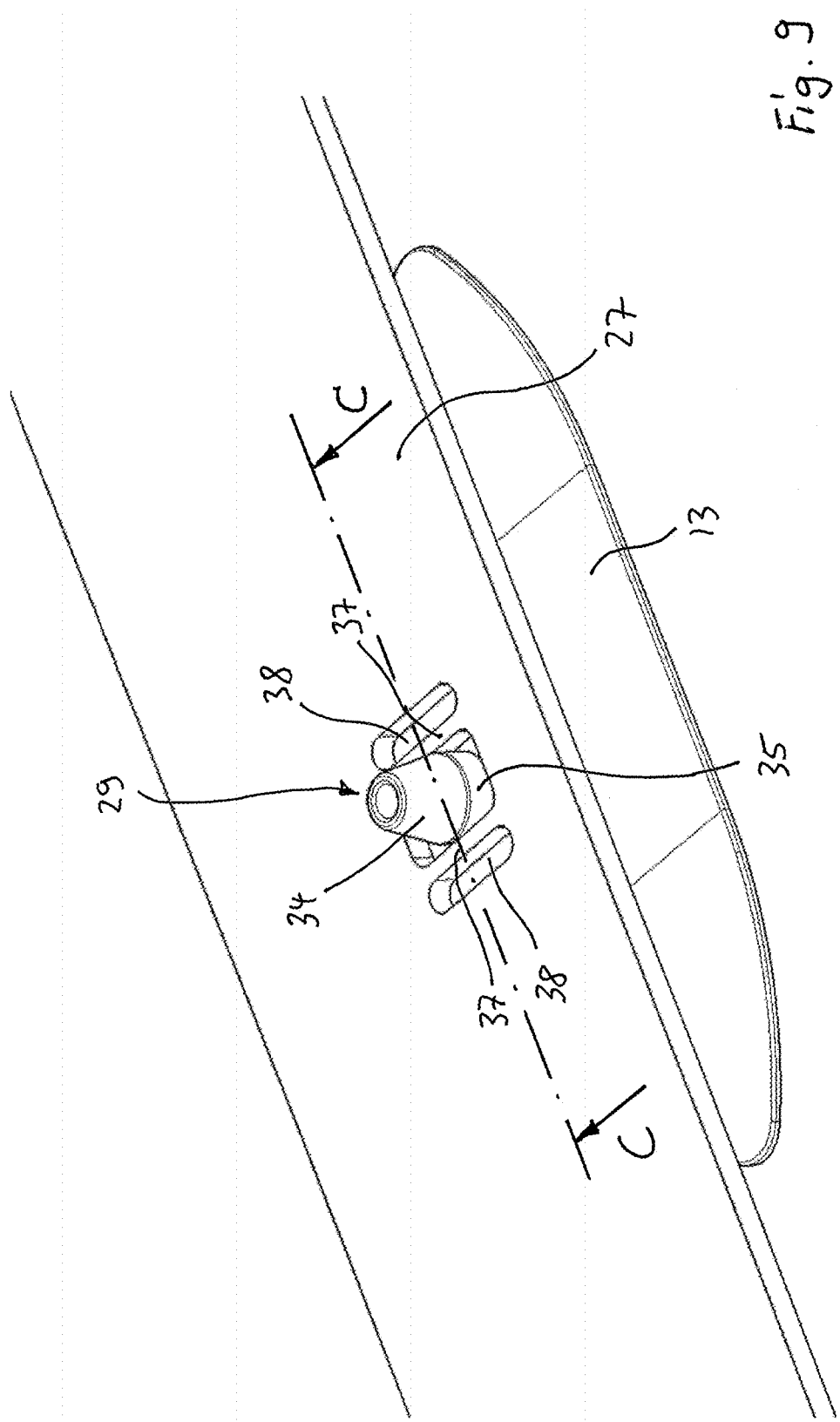
FIG. 9 shows an isometric view of the support plate with a further embodiment of the fastening device.
Figure 10:
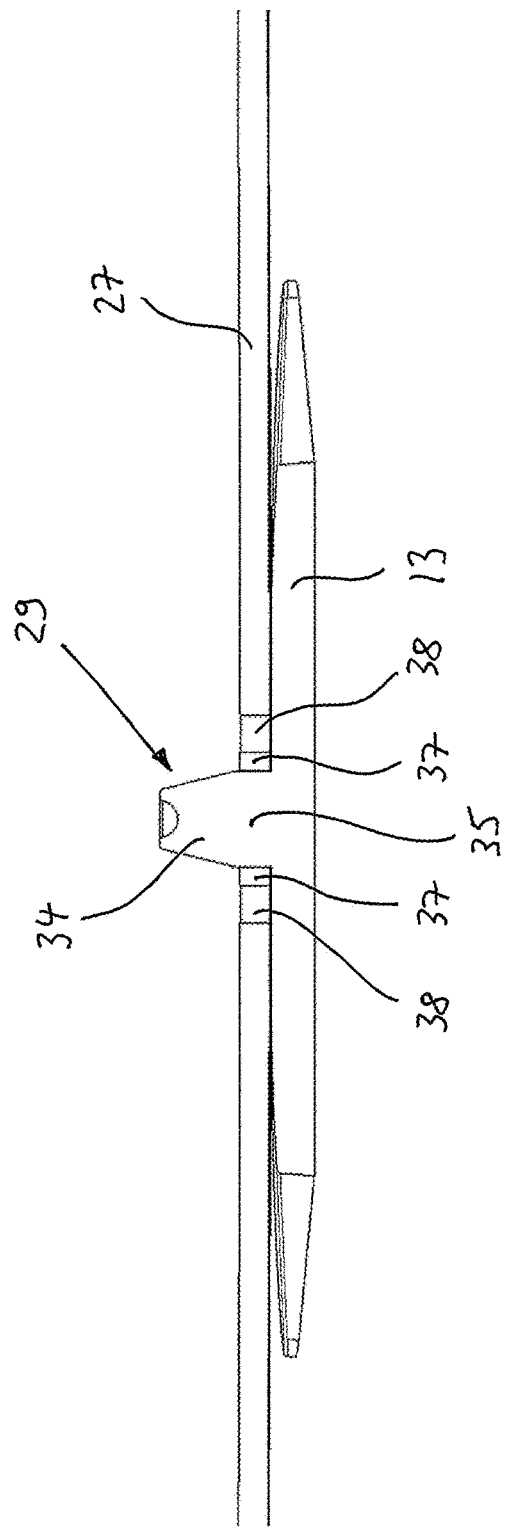
FIG. 10 shows a cross-sectional view, along the sectional plane C-C in FIG. 9, of the support plate held on the light-incoupling elements by means of the fastening dome.

In the embodiment illustrated in FIGS. 9 and 10, the conical head 34 of the fastening dome 29 merges into the base 35 without an offset. The base 35 has a diameter greater than the width of the slot, with the result that the fastening dome 29 plugged into the second fastening cutout 33 or first fastening cutout 32 is clampingly held by the two bars 37 (not illustrated in FIGS. 9 and 10), which are spread apart from one another by means of the base 35, owing to their restoring force. The base 35 thus constitutes a spreading portion of the fastening dome 29.

Also provided is a covering 45 (see FIGS. 2, 4, 12 and 13), which covers the lighting device 4 with the light-incoupling elements 13 and the support plate 27 downwardly towards the vehicle interior in the manner of a screen or cladding. The covering 45 is fastened, for example by means of plug-in and/or latching connections, in the foamed-on edge structure 22 or a part attached thereto, for example a cladding part, at its outer longitudinal edge 46 that faces the side edge 6 of the vehicle window pane 3. The covering 45 has for example laterally protruding holding parts or tongues 47, which are inserted into preferably slit-like holding openings 48 of a lateral component or frame part 49.

The covering 45, on its inner longitudinal edge 50 situated opposite the outer longitudinal edge 46, is also fastened to the pane inner side 5 or inner pane 8 at a fastening point 52, for example by means of an adhesive bond 51. The fastening point 52 is located inwards from the light-incoupling elements 13 in the direction towards the window pane centre line 14 and preferably closely adjacent to the wedge tips 15 of the light-incoupling elements 13. These fastening means of the covering 45 are elements, mentioned by way of example, of a holding device for securely and firmly fixing the covering 45 to the vehicle window pane 3.

The front end 53 of the covering 45 adjoins a front transverse covering 54 of the vehicle window pane 3 or of the cover 23 and the rear end 55 of said covering adjoins a rear transverse covering 56 of the vehicle window pane 3 or of the cover 23. The covering 45 may expediently be moulded with a curvature in its longitudinal extent that corresponds to the curvature of the associated vehicle window pane 3.

The covering 45, on its inner side 57 which, in its fitted position, is directed towards the support plate 27 and towards the inner pane 8, has a pressing device 58 which preloads the support plate 27 against the light-incoupling elements 13 in its fitted position. As pressing device 58, the covering 45 preferably contains two lips, first lip 59 and second lip 60, which extend over the length of the support plate 27 on either side of the fastening dome 29, at a spacing from one another in the transverse direction of the support plate 27 and next to one another. In this case, the outer first lip 59 curves outwards in the direction towards the side edge 6 of the vehicle window pane 3 when it exerts a contact pressure against the support plate 27, while the inner lip 60 curves inwards in the direction towards the window pane longitudinal centre line 14 when it exerts a contact pressure against the support plate 27.

The two lips, first lip 59 and second lip 60, are moulded or foamed onto the covering 45 from a plastic such as TPE or TPV, preferably in a 2-component injection moulding process. The covering 45 is made of a plastic such as PC, ABS or a mixture of PC and ABS. The lips, first lip 59 and second lip 60, are preferably moulded and produced such that their preload force caused by elastic deformation subjects the support plate 27 to load uniformly on either side of the fastening dome 29. The covering 45 comprising the pressing device 58, or the lips, first lip 59 and second lip 60, can be used in the case of a fastening device 28 with fastening domes 29 which hold the support plate 27 both centred and fixedly in accordance with the description above. However, the covering 45 may also be used in the case of a fastening device 28 with fastening domes 29 which (see FIG. 12) only ensure the correct positioning of the support plate 27 relative to the light-incoupling elements 13, but do not fix or clamp the support plate 27. The support plate 27 can therefore also be fixed or clamped exclusively by the pressing device 58, or by first lip 59 and second lip 60.

Figure 5:
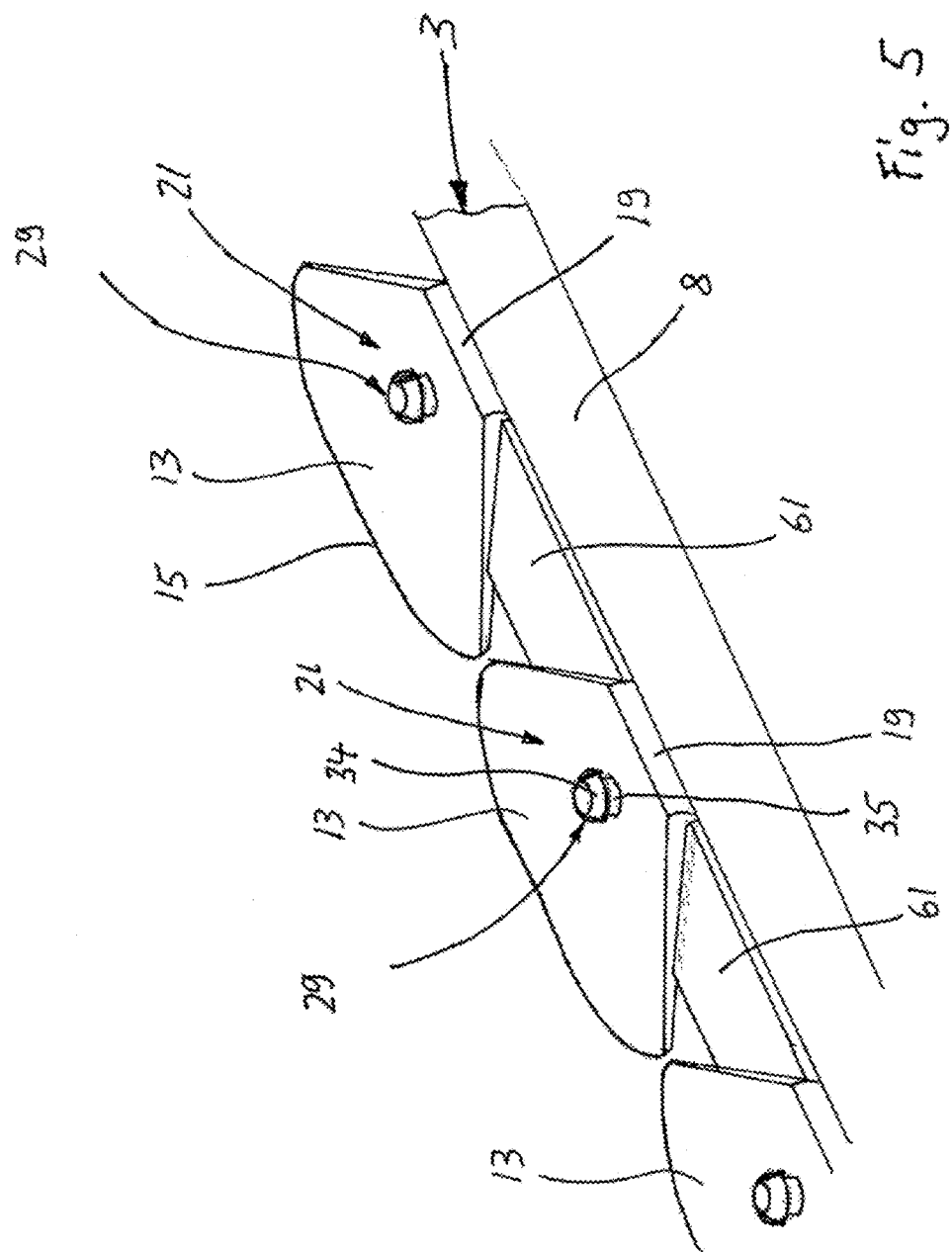
FIG. 5 shows an isometric view of multiple light-incoupling elements of the lighting device, which are arranged on the vehicle window pane.

If the light-incoupling elements 13 on the pane inner side 5 are foamed or moulded onto the light guide layer 10, they may be connected to one another via connecting bars 61 (FIG. 5). Two respective adjacent light-incoupling elements 13 are connected to one another via such a connecting bar 61.

Ambient light illumination can be provided by the two lighting devices 4, which are arranged symmetrically with respect to a vertical longitudinal centre plane of the roof in the region of the respective side edge of the vehicle window pane 3.

A vehicle roof often has an upwardly rising curvature. A vehicle window pane 3 of the vehicle roof that has a corresponding curvature may be curved in the longitudinal direction (x direction) along the series of light-incoupling elements 13. If the elongate strip-shaped support plate 27 is fastened to the light-incoupling elements 13 by means of the fastening device 4 and, if appropriate, also by means of the covering 45, even if it is fundamentally hard and deformation-resistant it can be adapted to the curvature of the vehicle window pane 3 along the series of light-incoupling elements 13 with an approximately arcuate deformation. The support plate 27 is designed for this owing to a configuration and material selection which take this property into account.

LIST OF REFERENCE SIGNS

1 Vehicle roof
2 Roof opening
3 Vehicle window pane
4 Lighting device
5 Pane inner side
6 Side edge 7 Outer pane
8 Inner pane
9 Connecting layer
10 Light guide layer
11 LED
12 Light incoupling unit
13 Light incoupling element
14 Window pane longitudinal centre line
15 Wedge tip
16 Base face
17 Connecting layer
18 Inner face
19 Light incidence face
2 Outer side
21 Top side
22 Foamed-on edge structure
23 Cover
24 Bezel
25 Pane top side
26 Fastening leg
27 Support plate
28 Fastening device
29 Fastening dome
30 Bearing face
31 First Cutout
32 First Fastening cutout
33 Second Fastening cutout
34 Head
35 Base
36 Lower edge
37 Bar
38 Auxiliary cutout
39 Soft region
40 Conical surface
41 Second Cutout
42 Ring
43 First Flank face
44 Second Flank face
45 Covering
46 Outer longitudinal edge
47 Tongue
48 Holding opening
49 Frame part
50 Inner longitudinal edge
51 Adhesive bond
52 Fastening point
53 Front end
54 Front transverse covering
55 Rear end
56 Rear transverse covering
57 Inner side
58 Pressing device
59 First Lip
60 Second Lip
61 Connecting bar

The invention claimed is:

1. Vehicle window pane with a light guide layer and with a lighting device which introduces light from a lamp into the light guide layer via a light-incoupling unit arranged on the light guide layer, wherein:
the lamp is mounted on a support plate and a fastening device keeps the support plate positioned in such a position on the light-incoupling unit in which the lamp is correctly positioned to radiate light into the light-incoupling unit,
a covering which covers the support plate is provided,
the covering is kept in its covering position on the vehicle window pane by means of a holding device, and
the covering comprises a pressing unit, which preloads the support plate against the light-incoupling unit, on its inner side that faces the support plate.

2. Vehicle window pane according to claim 1,
wherein the covering, or the pressing unit, comprises at least one elongate element which presses against the support plate under elastic deformation.

3. Vehicle window pane according to claim 2,
wherein the elongate element is a leg of a U-shaped profile or a first lip and/or second lip.

4. Vehicle window pane according to claim 2,
wherein the light-incoupling unit is formed as an elongate structural unit,
the support plate, in the form of an elongate strip, is adapted to the light-incoupling unit,
the support plate is mounted on fastening domes of the light-incoupling unit, which are arranged in series,
the fastening domes engage in cutouts in the support plate that are arranged in series, and
two of the elements, legs or first and/or second lie against the support plate on either side of the series of fastening dome or cutouts.

5. Vehicle window pane according to claim 4,
wherein the elements, legs or first and/or second are moulded or foamed onto the covering from a plastic.

6. Vehicle window pane according to claim 1,
wherein the covering is moulded or foamed from a plastic.

7. Vehicle window pane according to claim 1,
wherein the lighting device with the light-incoupling unit is arranged with an extent along a side edge of the vehicle window pane that is at the side of a window pane longitudinal centre line, and
wherein a front end of the covering adjoins a front transverse component or a front transverse covering of the vehicle window pane and a rear end of the covering adjoins a rear transverse component or a rear transverse covering of the vehicle window pane.

8. Vehicle window pane according to claim 1,
wherein the holding device has plug-in parts or tongues, which are arranged on the covering and engage in cutouts or holding openings of a foamed-on edge structure of the vehicle window pane or a part held by the foamed-on edge structure.

9. Vehicle window pane according to claim 1,
wherein the fastening device comprises at least one fastening dome which protrudes from the light-incoupling unit and projects into a first and/or second fastening cutout in the support plate,
wherein the deformation-resistant support plate comprises at least one soft region which delimits the first and/or second fastening cutout and is made to be elastically deformable,
wherein a spreading portion of the fastening dome spreads the first and/or second fastening cutout by elastically deforming the soft region
when the fastening dome is being inserted into the first and/or second fastening cutout and/or
in the functional position of the fastening dome in which it is inserted into the first and/or second fastening cutout.

10. Vehicle window pane according to claim 9,
wherein the first and/or second fastening cutout is a slot, and in that at least one of the two longitudinal sides of the first and/or second fastening cutout is formed by the soft region, wherein a bar forms the soft region, wherein the bar is shaped between an auxiliary cutout formed in the support plate and the first and/or second fastening cutout, and wherein the auxiliary cutout, which is in the form of a slot, is parallel and adjacent to the first and/or second fastening cutout.

11. Vehicle window pane according to claim 1, wherein the covering is moulded or foamed from polycarbonate, acrylonitrile-butadiene-styrene or a mixture of polycarbonate and acrylonitrile-butadiene-styrene.

12. Vehicle window pane according to claim 5, wherein the plastic is at least one of a thermoplastic elastomer and a thermoplastic vulcanizate.

\* \* \* \* \*